(12) United States Patent
May et al.

(10) Patent No.: US 7,290,122 B2
(45) Date of Patent: Oct. 30, 2007

(54) DATAFLOW GRAPH COMPRESSION FOR POWER REDUCTION IN A VECTOR PROCESSOR

(75) Inventors: Philip E. May, Palatine, IL (US); Brian G. Lucas, Barrington, IL (US); Kent D. Moat, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 437 days.

(21) Appl. No.: 10/652,134

(22) Filed: Aug. 29, 2003

(65) Prior Publication Data

US 2005/0050300 A1   Mar. 3, 2005

(51) Int. Cl.
   *G06F 9/308*   (2006.01)
   *G06F 15/18*   (2006.01)
(52) U.S. Cl. ............................... 712/224; 712/7; 712/24
(58) Field of Classification Search .................. 712/7, 712/224, 24
   See application file for complete search history.

(56) References Cited

U.S. PATENT DOCUMENTS

| | | | |
|---|---|---|---|
| 3,718,912 A | 2/1973 | Hasbrouck et al. | |
| 4,128,880 A | 12/1978 | Cray, Jr. | |
| 4,744,043 A | 5/1988 | Kloker | |
| 4,760,545 A | 7/1988 | Inagami et al. | |
| 4,807,183 A | 2/1989 | Kung et al. | |
| 4,825,361 A | 4/1989 | Omoda et al. | |
| 4,918,600 A | 4/1990 | Harper et al. | |
| 5,206,822 A | 4/1993 | Taylor | |
| 5,317,734 A | 5/1994 | Gupta | |
| 5,367,494 A * | 11/1994 | Shebanow et al. | 365/230.03 |
| 5,390,352 A | 2/1995 | Kinoshita | |
| 5,418,953 A | 5/1995 | Hunt et al. | |
| 5,423,040 A | 6/1995 | Epstein et al. | |
| 5,450,607 A | 9/1995 | Kowalczyk et al. | |
| 5,495,617 A | 2/1996 | Yamada | |
| 5,542,084 A * | 7/1996 | Lowe, Jr. | 345/501 |
| 5,652,909 A | 7/1997 | Kodosky | |
| 5,697,788 A | 12/1997 | Ohta | |
| 5,717,947 A | 2/1998 | Gallup et al. | |

(Continued)

OTHER PUBLICATIONS

Al-Mouhamed, M., "Lower Bound on the Number of Processors and Time for Scheduling Precedence Graphs with Communication Costs", IEEE, Dec. 1990.

(Continued)

*Primary Examiner*—Daniel H. Pan

(57) ABSTRACT

A method and apparatus for power reduction in a processor controlled by multiple-instruction control words. A multiple-instruction control word comprises a number of ordered fields, with each ordered field containing an instruction for an element of the processor. The sequence of instructions for a loop is compressed by identifying a set of aligned fields that contain NOP instructions in all of the control words of the sequence. The sequence of control words is then modified by removing the fields of the identified aligned set containing NOP instructions and adding an identifier that identifies the set of fields removed. The sequence of control words is processed by fetching the identifier at the start the loop, then, for each control word in the sequence, fetching a control word and reconstructing the corresponding uncompressed control word by inserting NOP instructions into the compressed control word as indicated by the identifier. The identifier may be a bit mask and may used to disable memory units and processing elements for the duration of the loop to reduce power consumption by the processor.

8 Claims, 2 Drawing Sheets

FIELD NUMBER

| | 1 | 2 | 5 | 6 | 8 | 9 | 10 |
|---|---|---|---|---|---|---|---|
| VLIW 1 | NOP | * | * | NOP | NOP | * | * |
| VLIW 2 | * | NOP | * | * | * | * | NOP |
| VLIW 3 | * | NOP | * | NOP | * | * | NOP |
| VLIW 4 | * | NOP | * | * | NOP | * | * |

U.S. PATENT DOCUMENTS

| | | | |
|---|---|---|---|
| 5,719,998 A | 2/1998 | Ku et al. | |
| 5,734,863 A | 3/1998 | Kodosky et al. | |
| 5,742,821 A | 4/1998 | Prasanna | |
| 5,764,787 A | 6/1998 | Nickerson | |
| 5,790,877 A | 8/1998 | Nishiyama et al. | |
| 5,805,614 A | 9/1998 | Norris | |
| 5,821,934 A | 10/1998 | Kodosky et al. | |
| 5,826,080 A | 10/1998 | Dworzecki | |
| 5,852,729 A * | 12/1998 | Limberis et al. | 712/225 |
| 5,881,257 A | 3/1999 | Glass et al. | |
| 5,881,263 A | 3/1999 | York et al. | |
| 5,887,183 A | 3/1999 | Agarwal et al. | |
| 5,893,143 A * | 4/1999 | Tanaka et al. | 711/120 |
| 5,936,953 A | 8/1999 | Simmons | |
| 5,966,528 A | 10/1999 | Wilkinson et al. | |
| 5,969,975 A | 10/1999 | Glass et al. | |
| 5,999,736 A | 12/1999 | Gupta et al. | |
| 6,052,766 A | 4/2000 | Betker et al. | |
| 6,064,819 A | 5/2000 | Franssen et al. | |
| 6,104,962 A | 8/2000 | Sastry | |
| 6,112,023 A | 8/2000 | Dave et al. | |
| 6,128,775 A | 10/2000 | Chow et al. | |
| 6,173,389 B1 * | 1/2001 | Pechanek et al. | 712/24 |
| 6,192,384 B1 | 2/2001 | Daily et al. | |
| 6,202,130 B1 | 3/2001 | Scales et al. | |
| 6,253,372 B1 | 6/2001 | Komatsu et al. | |
| 6,370,560 B1 | 4/2002 | Robertazzi et al. | |
| 6,381,687 B2 | 4/2002 | Sandstrom et al. | |
| 6,430,671 B1 | 8/2002 | Smith | |
| 6,437,804 B1 | 8/2002 | Ibe et al. | |
| 6,442,701 B1 | 8/2002 | Hurd | |
| 6,490,612 B1 | 12/2002 | Jones et al. | |
| 6,513,107 B1 | 1/2003 | Ansari | |
| 6,571,016 B1 * | 5/2003 | Mehrotra et al. | 382/236 |
| 6,588,009 B1 | 7/2003 | Guffens et al. | |
| 6,598,221 B1 | 7/2003 | Pegatoquet et al. | |
| 6,629,123 B1 | 9/2003 | Hunt | |
| 6,647,546 B1 | 11/2003 | Hinker et al. | |
| 6,665,749 B1 | 12/2003 | Ansari | |
| 6,732,354 B2 | 5/2004 | Ebeling et al. | |
| 6,745,160 B1 | 6/2004 | Ashar et al. | |
| 6,792,445 B1 | 9/2004 | Jones et al. | |
| 6,795,908 B1 | 9/2004 | Lee et al. | |
| 6,898,691 B2 | 5/2005 | Blomgren et al. | |
| 7,000,232 B2 | 2/2006 | Jones et al. | |
| 7,010,788 B1 | 3/2006 | Rehg et al. | |
| 2002/0080795 A1 | 6/2002 | Van Wageningen et al. | |
| 2002/0112228 A1 | 8/2002 | Granston et al. | |
| 2002/0120923 A1 | 8/2002 | Granston et al. | |
| 2003/0128712 A1 | 7/2003 | Moriwaki et al. | |
| 2004/0003206 A1 | 1/2004 | May et al. | |
| 2004/0117595 A1 | 6/2004 | Norris | |
| 2005/0053012 A1 | 3/2005 | Moyer | |
| 2005/0055534 A1 | 3/2005 | Moyer | |
| 2005/0055543 A1 | 3/2005 | Moyer | |

OTHER PUBLICATIONS

Samadzadeh, F. et al., "A Heuristic Multiprocessor Scheduling Algorithm for Creating Near-Optimal Schedules Using Task System Graphs", ACM, 1992.

Prasanna, G.N., et al., "Generalized Multiprocessor Scheduling for Directed Acylic Graphs", IEEE, 1994.

Kwok, Y. et al., "Static Scheduling Algorithms for Allocating Directed Task Graphs to Multiprocessors", ACM, Dec. 1999.

Lam, M., Software Pipelining: An Effective Scheduling Technique for VLIW Machines, Proceedings of the SIGPLAN '88 Conference on Programming Language Design and Implementation, Atlanta, Georgia, Jun. 22-24, 1988, pp. 318-328.

Lee, T. et al., A Transformation-Based Method for Loop Folding, IEEE Transactions on Computer-Aided Design of Integrated Circuits and Systems, vol. 13, No. 4, Apr. 1994, pp. 439-450.

Kavi, K.M. et al., A Formal Definition of Data Flow Graph Models, IEEE Transactions on Computers, vol. C-35, No. 11, Nov. 1986, pp. 940-948.

Cooper, K.D. et al., Efficient Computation of Flow Insensitive Interprocedural Summary Information, SIGPLAN Notices, vol. 19, No. 6, Jun. 1984, pp. 247-258.

Strong, H.R., Vector Execution of Flow Graphs, Journal of the Association for Computing Machinery, vol. 39, No. 1, Jan. 1983, pp. 186-196.

Aiken, A. et al., Resource-Constrained Software Pipelining, IEEE Transactions on Parallel and Distributed Systems, vol. 6, No. 12, Dec. 1995, pp. 1248-1270.

Wulf, William A. "Evaluation of the WM Architecture." Proceedings of the 19th Annual International Symposium on Computer Architecture: 1992, pp. 382-390, ACM 0-89791-509-7/92/0005/0382.

Talla, D.,Architectural techniques to Accelerate Multimedia Applications on General-Purpose Processors, Dissertation, Aug. 2001, pp. 94-125.

Talla, D.,Bottlenecks in Multimedia Processing with SIMD Style Extensions and Architectural Enhancements, IEEE Transactions of Computers, Aug. 2003, pp. 1015-1031, vol. 62, No. 8, IEEE.

Hennessy and Patterson, Computer Architecture A Quantitative Approach, 1996, Morgan Kaufman Publishers, Inc., Second Edition, pp. 239-247.

* cited by examiner

FIELD NUMBER

|  | 1 | 2 | 3 | 4 | 5 | 6 | 7 | 8 | 9 | 10 |
|---|---|---|---|---|---|---|---|---|---|---|
| VLIW 1 | NOP | * | NOP | NOP | * | NOP | NOP | NOP | * | * |
| VLIW 2 | * | NOP | NOP | NOP | * | * | NOP | * | * | NOP |
| VLIW 3 | * | NOP | NOP | NOP | * | NOP | NOP | * | * | NOP |
| VLIW 4 | * | NOP | NOP | NOP | * | * | NOP | NOP | * | * |
| MASK | 1 | 1 | 0 | 0 | 1 | 1 | 0 | 1 | 1 | 1 |

*FIG. 1*

FIELD NUMBER

|  | 1 | 2 | 5 | 6 | 8 | 9 | 10 |
|---|---|---|---|---|---|---|---|
| VLIW 1 | NOP | * | * | NOP | NOP | * | * |
| VLIW 2 | * | NOP | * | * | * | * | NOP |
| VLIW 3 | * | NOP | * | NOP | * | * | NOP |
| VLIW 4 | * | NOP | * | * | NOP | * | * |

*FIG. 2*

| MASK | 1 | 1 | 0 | 0 | 1 | 1 | 0 | 1 | 1 | 1 |
|---|---|---|---|---|---|---|---|---|---|---|

*FIG. 3*

DATAFLOW GRAPH COMPRESSION FOR POWER REDUCTION IN A VECTOR PROCESSOR

CROSS REFERENCE TO RELATED APPLICATIONS

This application is related to application Ser. No. 10/184,772 titled "Scheduler for Streaming Vector Processor", filed Jun. 28, 2002 and to application Ser. No. 10/184,583, titled "Reconfigurable Streaming Vector Processor", filed Jun. 28, 2002.

FIELD OF THE INVENTION

This invention relates generally to the field of microprocessors. More particularly, certain embodiments consistent with this invention relate to a method and apparatus for dataflow graph compression for power and memory reduction.

BACKGROUND OF THE INVENTION

VLIW (very long instruction word) processors are characterized by their ability to process multiple instructions in parallel using different functional units within the processor. Other processors, such as dual-path processors have a similar capability. A VLIW instruction comprises a number of sub-words or fields, each of which controls a functional unit within the processor. Fully parallel operation, in which all functional units are used at each time step, is rare. More commonly, many instructions contain "NOP" instructions in several of the sub-words or fields, indicating that the corresponding functional unit is not operated at that time step.

Power reduction in processors controlled by VLIWs or other multiple-instruction words is very important in handheld computing devices, such as PDAs, digital cameras, navigation devices and cellular telephone handsets that rely on battery power. Power reduction can be used to reduce the weight and/or increase the operating time of a device. Two techniques for power saving are (i) reducing memory accesses by reducing the size of the program of instructions (compression), and (ii) disabling hardware resources (memory and functional units) when they are not required.

VLIW compression schemes are used in many VLIW architectures (e.g., IA-64, StarCore, TI DSPs). The goal of these schemes is the elimination of all NOPs from the instruction stream. This reduces the memory requirements for the code, and it reduces the memory bandwidth required to fetch instructions.

In one method of power saving, special instructions are added to a processor to shut down the datapath elements under program control. In a further method, datapath elements are disabled based on an instruction pre-decode stage. The instruction words are examined and the datapath is dynamically disabled on an instruction-by-instruction basis. A disadvantage of these approaches is that they add to dataflow graph complexity.

In one method of compression, NOPs are eliminated from the code by rearranging the slices within VLIW words, so that NOP fields in sequential VLIWs line up (are at the same location in the VLIW word). This allows banks of memory to be powered off for periods of time, saving power. A disadvantage of this method is the complexity associated with rearranging the slices within VLIW words.

OVERVIEW OF CERTAIN EMBODIMENTS OF THE INVENTION

Certain embodiments consistent with the present invention relate generally to memory and power saving in microprocessors that use multiple-instruction control words. Objects, advantages and features of the invention will become apparent to those of ordinary skill in the art upon consideration of the following detailed description of the invention.

In accordance with certain embodiments of the invention is a mechanism for efficiently eliminating NOPs from multiple-instruction control words, while at the same time disabling unused elements in the processor and unused instruction memory banks. A multiple-instruction control word comprises a number of ordered fields, with each field containing an instruction for an element of the processor. The sequence of instructions for a loop is compressed by identifying a set of 'aligned' fields that contain NOP instructions in all of the control words of the sequence. The NOP instructions are 'aligned' if they occur at the same position within the control word, i.e. they are associated with the same element of the processor. The sequence of control words is then modified by removing the fields in the identified set of aligned fields containing NOP instructions and adding an identifier that identifies the set of fields removed. The sequence of control words is processed by fetching the identifier at the start the loop, then, for each control word in the sequence, fetching a control word and reconstructing the corresponding uncompressed control word by inserting NOP instructions into the compressed control word as indicated by the identifier. The identifier may be a bit-mask and may used to disable memory units and processing elements for the duration of the loop to reduce power consumption by the processor.

BRIEF DESCRIPTION OF THE DRAWINGS

The novel features believed characteristic of the invention are set forth in the appended claims. The invention itself, however, together with objects and advantages thereof, will best be understood by reference to the following detailed description of certain illustrative embodiments consistent with the present invention when read in conjunction with the accompanying drawing(s), wherein:

FIG. 1 is an exemplary sequence of multiple-instruction control words.

FIG. 2 is an exemplary sequence of compressed multiple-instruction control words in accordance with certain aspects of the invention.

FIG. 3 is an exemplary compression mask.

DETAILED DESCRIPTION

Figure 4:
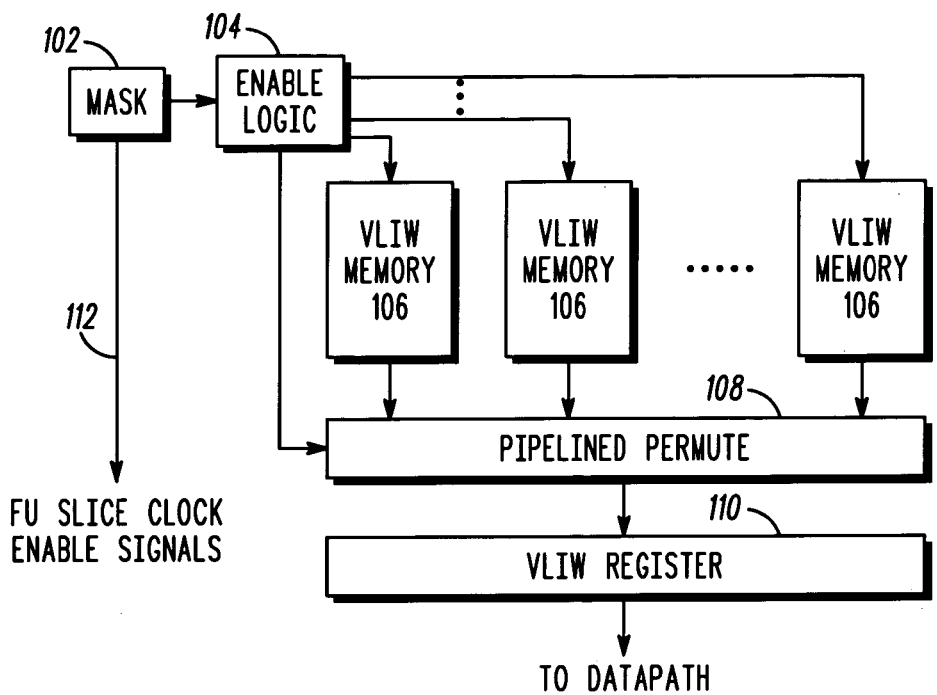
FIG. 4 is a diagrammatic representation of a system in accordance with certain aspects of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The invention is described with reference to a re-configurable streaming vector processor (RSVP). However, the invention is applicable to other processors that use multiple-instruction control words.

The RSVP is a statically scheduled VLIW machine that executes dataflow graphs on vector data (data streams) in a highly pipelined fashion. Typically, a dataflow graph is a representation of the entire inner loop of a computation. The VLIW nature of RSVP can be exploited to reduce the power in the RSVP datapath by disabling the portions of the datapath that are not utilized by a particular dataflow graph. This mechanism is simple, inexpensive, and provides significant power savings.

A dataflow graph in RSVP is represented as a collection of VLIW control words that are executed repeatedly as a loop. These control words contain sub-words or fields, each of which is responsible for controlling a portion of the datapath (datapath element). An exemplary dataflow graph is shown in FIG. 1. Referring to FIG. 1, the top four rows of the table represent VLIW control instructions. In this example, the processor has ten datapath elements. Each VLIW comprises ten ordered fields, one for each of the datapath elements. Thus, the columns of the table contain the instructions for each datapath element. Each column of the table is also described herein as a set of aligned fields. The asterisks denote instructions other then NOP instructions (No Operation). Thus, for example, VLIW 1 contains NOPs for datapath elements 1, 3, 4, 6, 7 and 8, but does contain instructions for datapath elements 2, 5, 9 and 10. According to one aspect of the method of the present invention, all control fields that contain NOPs for all VLIWs in the loop are identified. If a column contains only NOP instructions, then the associated datapath element is not used in the execution of the graph.

According to one aspect of the present invention, any columns that contain only NOPs are eliminated when the executable code is created. In addition, the VLIWs are compressed by removing these NOPs. A compression mask, shown as the last row in the FIG. 1, is created to identify which columns have been removed. In this example, the compression mask has '0' values corresponding to the eliminated columns and '1' values for the remaining columns. Since the ordering of the fields is not affected by the compression, the original VLIWs may be reconstructed from the compressed instructions and the compression mask. In operation, the compression mask is passed to the processor and used to reconstruct the VLIWs. In one embodiment the compression mask is placed in a VLIW header word (part of the RSVP executable containing graph information and characteristics) and may be used in VLIW reconstruction and datapath element and memory bank disabling.

This approach is in contrast to prior techniques since the entire data graph is considered in the compression operation and only the NOPs that are naturally aligned are removed. The fields in the VLIWs are not rearranged to line up NOPs. Thus, the compression technique of the present invention is simple to implement and may be automated.

The resulting compressed VLIWs are shown in FIG. 2. In FIG. 2, there are no instructions for the datapath elements 3, 4 and 7, since these elements are not used in the execution of the graph. The corresponding compression mask is shown in FIG. 3. Indicators other than a bit-mask may be used without departing from the present invention.

One embodiment of a system for processing VLIW instructions is illustrated in FIG. 4. Referring to FIG. 4, when a graph is executed, the header is fetched first, and the compression mask is latched in the mask latch 102. The compression mask is presented to logic device 104 that decodes the mask and enables the correct number of memory banks 106 in the VLIW memory as well as programming the pipelined permute unit 108. As VLIWs are transferred from main memory to the VLIW memory 106, only the enabled banks are used, and when the graph executes (from VLIW memory), the disabled banks draw minimal power. The pipelined permute unit 108 uses the compression mask to reconstruct the VLIWs by placing NOP operation codes in the fields indicated by '0' in the mask. These complete VLIW words are placed in VLIW register 110 and presented to the datapath for execution.

In addition, the compression mask is passed via link 112 to the datapath elements and is used to enable or disable the datapath elements. Since the mask locations map 1:1 to the datapath elements (control fields), the raw mask bits may be used to clock gate the datapath. The datapath element shutdown is initiated using the compression mask supplied in a header word associated with a dataflow graph. This mask is examined once, and for the duration of the dataflow graph in question, the affected function units remain disabled.

The task of MPEG4 encoding on an RSVP is now considered as an example. In MPEG4 encoding on the RSVP, there are 18 separate dataflow graphs. Upon averaging all 18 graphs, 52% of the datapath control fields in the VLIW word are unused, and the corresponding datapath elements can be disabled for the duration of the graph. In addition, approximately half of the VLIW memory banks can be disabled.

Figure 5:
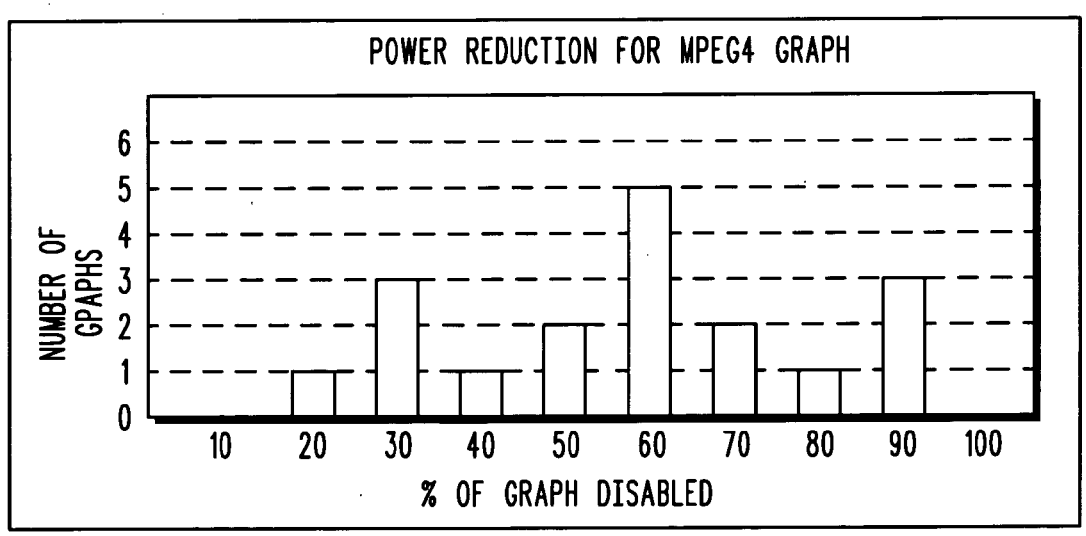
FIG. 5 is a histogram illustrating processor power reduction using the present invention.

FIG. 5 shows a breakdown of these graphs as a histogram, with each bin corresponding to 10% VLIW field disabling. Each bar indicates the number of graphs that fall in that percentage. The largest single bin is 60% of VLIW fields (datapath elements) disabled, and over half of the graphs (11) have 60% or greater of their datapath elements disabled.

The present invention combines both memory and datapath power reduction in a single mechanism.

Those of ordinary skill in the art will recognize that the present invention has been described in terms of exemplary embodiments based upon use of dataflow graphs for an RSVP. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for a processor to process a sequence of a plurality of multiple-instruction control words, each control word comprising a plurality of ordered fields and each ordered field containing an instruction for a corresponding element of the processor, the method comprising:
- fetching an identifier having one bit for each element of the processor, wherein a bit of the identifier is set if a corresponding ordered field contains a NOP instruction in every control word of the sequence of control words;
- disabling an element of the processor, to reduce power consumption by the processor, if a corresponding bit of the identifier is set; and, while the element is disabled:
- for each control word of the sequence of multiple-instruction control words;
- fetching a control word;
- the processor executing the control word.

2. A method in accordance with claim 1, wherein the processor further comprises a plurality of memory banks each associated with an element of a processor, the method further comprising:
- disabling a memory bank of the plurality of memory banks while the sequence of control words is processed, to reduce power consumption by the processor further, if a corresponding bit of the identifier is set;
- enabling other memory banks of the plurality of memory banks; and
- for each control word of the sequence of control words:
  - storing the control word in the enabled subset of memory banks.

3. A system for processing a compressed sequence of a plurality of multiple-instruction control words, each control word comprising a plurality of ordered fields and each ordered field containing an instruction for an element of a processor, the system comprising:
- a mask latch for storing a compression mask having one bit for each element of the processor, wherein a bit of the compression mask is set if a corresponding ordered field contains a NOP instruction in every multiple-instruction control word of the sequence of control words;
- a logic unit coupled to the mask latch and responsive to the compression mask;
- a memory for storing one or more compressed multiple-instruction control words;
- a pipelined permute unit, coupled to the logic unit and the memory, that reconstructs multiple-instruction control words by fetching a compressed multiple-instruction control word from the memory and inserting NOP instructions in accordance with the compression mask; and
- an instruction register, coupled to the pipelined permute unit, that provides reconstructed multiple-instruction control words to the processor.

4. A system in accordance with claim 3, wherein the memory comprises a plurality of memory banks coupled to the logic unit, and wherein the logic unit disables memory banks in accordance with the compression mask, the memory banks remaining disabled while the sequence of control words is processed.

5. A system in accordance with claim 3, further comprising:
- a plurality of processing elements coupled to the mask latch and the instruction register and controlled by the reconstructed multiple-instruction control words, wherein the compression mask is used to disable processing elements of the plurality of processing elements that are unused by all control words of the sequence of multiple-instruction control words.

6. A system in accordance with claim 5, wherein the plurality of processing elements form part of a re-configurable streaming vector processor, and wherein the sequence of multiple-instruction control words is a sequence of VLIWs of a dataflow.

7. A system for processing a sequence of a plurality of multiple-instruction control words, each control word comprising a plurality of ordered fields and each ordered field containing an instruction for a datapath element of a processor, the system comprising:
- a mask latch for storing a bit mask having one bit for each datapath element, wherein a bit of the bit mask is set if a corresponding ordered field contains a NOP instruction in every multiple-instruction control word of the sequence of control words;
- a plurality of memory banks that stores instructions of a multiple-instruction control word;
- a plurality of datapath elements;
- a logic unit, coupled to the mask latch, the memory banks and the datapath elements, that enables and disables the plurality of memory banks and the plurality of datapath elements, in accordance with the bit mask, before the sequence of control words is processed; and
- an instruction register, coupled to the memory banks, that provides instructions to the datapath elements.

8. A system in accordance with claim 7, wherein the plurality of datapath elements form part of a re-configurable streaming vector processor, and wherein the sequence of a plurality multiple-instruction control words is a sequence of VLIWs of a dataflow.

* * * * *